United States Patent
Avallone et al.

(12) 
(10) Patent No.: US 12,343,937 B2
(45) Date of Patent: Jul. 1, 2025

(54) EXTRUDER, PRINT HEAD AND APPARATUS FOR ADDITIVE MANUFACTURING

(71) Applicant: CARACOL S.R.L., Lomazzo (IT)

(72) Inventors: Giovanni Avallone, Lomazzo (IT); Paolo Cassis, Lomazzo (IT); Francesco De Stefano, Lomazzo (IT); Jacopo Gervasini, Lomazzo (IT); Nicolò Bordoli, Lomazzo (IT)

(73) Assignee: CARACOL S.R.L., Lomazzo (IT)

( * ) Notice: Subject to any disclaimer, the term of this patent is extended or adjusted under 35 U.S.C. 154(b) by 0 days.

(21) Appl. No.: 17/790,045

(22) PCT Filed: Apr. 30, 2021

(86) PCT No.: PCT/IB2021/053634
§ 371 (c)(1),
(2) Date: Jun. 29, 2022

(87) PCT Pub. No.: WO2022/214857
PCT Pub. Date: Oct. 13, 2022

(65) Prior Publication Data
US 2023/0321904 A1    Oct. 12, 2023

(30) Foreign Application Priority Data

Apr. 6, 2021  (IT) .................. 102021000008492

(51) Int. Cl.
*B29C 64/209* (2017.01)
*B29C 64/118* (2017.01)
*B33Y 30/00* (2015.01)

(52) U.S. Cl.
CPC ............ *B29C 64/209* (2017.08); *B33Y 30/00* (2014.12); *B29C 64/118* (2017.08)

(58) Field of Classification Search
CPC ..... B29C 64/209; B29C 64/118; B29C 48/05; B29C 48/02; B29C 48/266; B29C 48/395;
(Continued)

(56) References Cited

U.S. PATENT DOCUMENTS

| 5,974,643 A * | 11/1999 | Hays ..................... B25J 15/04 901/41 |
| 2017/0217088 A1* | 8/2017 | Boyd, IV .............. B29C 64/209 |

(Continued)

FOREIGN PATENT DOCUMENTS

| EP | 2883685 | 6/2015 |
| EP | 2905118 | 8/2015 |

(Continued)

OTHER PUBLICATIONS

English Translation of IT201800010225 (Year: 2018).*
(Continued)

*Primary Examiner* — Galen H Hauth
*Assistant Examiner* — Baileigh Kate Darnell
(74) *Attorney, Agent, or Firm* — Klintworth & Rozenblat LLP

(57) ABSTRACT

An extruder for additive manufacturing extends about, and along, a longitudinal axis and has an extrusion nozzle having a polygonal cross-section and a mounting member provided with:
  a ring configured to be mounted to a bearing coaxial to the extruder and allowing the rotation of the mounting member about the longitudinal axis;
  a hollow body arranged within the ring and configured to house, in part, an extrusion screw; and
  a plurality of spokes for connecting the hollow body to the ring so as to define compartments between the spokes-adjacent the hollow body and the ring.

9 Claims, 4 Drawing Sheets

(58) Field of Classification Search
CPC .. B29C 48/2522; B33Y 30/00; B25J 19/0025; B25J 19/0029; B25J 19/0033; B25J 19/0041
See application file for complete search history.

(56) References Cited

U.S. PATENT DOCUMENTS

| | | | |
|---|---|---|---|
| 2017/0320267 A1 | 11/2017 | Lind et al. | |
| 2018/0345577 A1* | 12/2018 | Takeyama | B29C 64/118 |
| 2020/0215749 A1 | 7/2020 | Susnjara et al. | |

FOREIGN PATENT DOCUMENTS

| | | |
|---|---|---|
| IT | 201800010225 | 5/2020 |
| KR | 20160107769 | 9/2016 |

OTHER PUBLICATIONS

International Search Report and Written Opinion dated Dec. 23, 2021, in connection with International Application No. PCT/IB2021/053634 (14 pages).

* cited by examiner

EXTRUDER, PRINT HEAD AND APPARATUS FOR ADDITIVE MANUFACTURING

CROSS-REFERENCE TO RELATED APPLICATIONS

This patent application claims priority from Italian patent application no. 102021000008492 filed on Jun. 4, 2021, the entire disclosure of which is incorporated herein by reference.

TECHNICAL FIELD

The present invention relates to an extruder for additive manufacturing or three-dimensional printing of polymers, technopolymers and composite materials.

In such scopes, the extruder for additive manufacturing is used for manufacturing products and semifinished products also of large dimensions and which require lightness, resistance and have complex geometries such as, for example, bodies e chassis in the nautical, aeronautical and automotive fields, machinery components and architectural structures.

BACKGROUND ART

Three-dimensional printing provides for manufacturing articles by means of an additive manufacturing process starting from a file of a three-dimensional digital model, made by means of a CAD modelling system.

The present invention relates, in particular, to the three-dimensional printing with Fused Deposition Model technology—FDM or Fused Filament Fabrication technology—FFF, which is based on the use of an extruder having a nozzle, typically with a circular section, wherefrom a melted thermoplastic polymeric material comes out. The melted thermoplastic polymeric material coming out of the extrusion nozzle is deposited in layers on a work surface, according to a predefined three-dimensional model. Once deposited by the extruder, the layer of thermoplastic polymeric material immediately solidifies and binds to a layer of underlying material. The succession of overlapped layers forms in such manner a single solid structure or final article with a desired shape.

The nozzle with circular section determines the forming of porosity in the cross-section of the products and the reduction in the contact surface between the following layers. The porosity entails a reduction in the mechanical properties of the components manufactured with this technology.

In order to overcome this drawback, the present Applicant has designed an extruder provided with a nozzle having a polygonal section, in particular rectangular, and wherein the extruder is selectively orientable so as to arrange the layers for increasing the adhesion surface between the layers reducing the interstices as shown in patent application IT102018000010225 belonging to the Applicant.

An extruder generally comprises a cylindrical body, a nozzle arranged at the free end of the cylindrical body, heating elements associated with the cylindrical body so as to heat the cylindrical body, an extrusion screw so as to advance and melt pellets of thermoplastic material in the cylindrical body and expel the melted thermoplastic material through the nozzle.

The heating elements, generally resistors, need power supply cables and a temperature control by means of thermocouples which, in turn, need signal cables.

On the one hand, the nozzle having a polygonal section in association with the swivel feature and the mobility of the extruder allow overcoming the problem of the excessive porosity of the manufacture made with additive manufacturing, on the other hand, the various cables associated with the extruder can be of hindrance to the maneuverability of the extruder and prejudice the operativity thereof.

The operating conditions are even more critical when the extruder is equipped with a guide external to the cylindrical body for supplying continuous fibres in the proximity of the nozzle as shown in patent application IT102018000007732 belonging to the present Applicant.

Subject Matter of the Invention

The object of the present invention is to manufacture an extruder that mitigates the drawbacks of the prior art.

In accordance with the present invention, an extruder for additive manufacturing is made, the extruder extending about, and along, a longitudinal axis and comprising an extrusion nozzle having a polygonal cross-section and a mounting member comprising:
a ring configured to be mounted to a bearing coaxial to the extruder and allowing the rotation of the mounting member about the longitudinal axis;
a hollow body arranged within the ring and configured to house, in part, an extrusion screw; and
a plurality of spokes for connecting the hollow body to the ring so as to define compartments between the spokes adjacent the hollow body and the ring.

This configuration allows orienting the extruder about its own longitudinal axis and consequently orienting the extrusion nozzle having a polygonal cross-section and, at the same time defining compartments for the purpose of constraining cables and service ducts of the extruder.

In particular, the hollow body has a first annular face configured to be connected to an actuator for rotating the extrusion screw and a second annular face configured to be connected to a thermal break ring.

In other words, the mounting member is a structural element of the extruder but thermally insulated from the hot part of the extruder.

In particular, the mounting member comprises a tubular fitting extending from the hollow body and configured to feed pellets of polymeric material within the hollow body.

A further function of the mounting member is to define a feeding mouth of the pellets of polymeric material.

In particular, the mounting member is made by an additive manufacturing process from polymeric material, in particular selected from polyamide with carbon fibres, PPS with carbon fibres, PEEK.

In this manner, it is possible to manufacture complex shapes in a single piece and at the same time provided with excellent mechanical characteristics. Furthermore, the mounting member is particularly light thanks to the internal honeycomb structure typical of the 3D printed components to the advantage of the maneuverability of the extruder.

In particular, the extruder comprises a drive member, in particular a gear, which is attached to the ring or is integrally manufactured with the mounting member.

This solution is advantageous for the fact of being particularly compact.

In particular, the extruder comprises:
a cylindrical body extending along the longitudinal axis and defining a melting chamber, the extrusion nozzle being arranged at the free end of the cylindrical body;

an extrusion screw rotatable within the cylindrical body about the longitudinal axis;

at least one heating element associated with the cylindrical body;

at least one temperature probe associated with the cylindrical body;

at least one power cable for supplying power to the heating element; and at least one signal cable for transmitting the signal acquired by the temperature probe, the power cable and the signal cable being arranged in at least one of said compartments.

These power and signal cables are, in actual fact, constrained by the mounting member which is substantially at room temperature and does not damage the power and signal cables.

In particular, the extruder comprises:

a thermal break ring, which is mounted to said mounting member and comprises a channel for a cooling liquid;

at least one supply duct for supplying the cooling liquid to the thermal break ring; and at least one return duct for evacuating the cooling liquid from the thermal break ring, wherein the supply duct and the return duct are arranged in at least one of said compartments.

The mounting member also constrains the supply duct and the return duct.

In particular, the extruder comprises a guide attached to the mounting member and configured to guide reinforcing fibres in the proximity of the extrusion nozzle.

The mounting member has the additional function of supporting said guide.

In particular, the extruder comprises a drive pulley mounted along the guide for driving the reinforcing fibres along the guide and feeding the reinforcing fibres in front of the extrusion nozzle.

In this manner, the fibres are guided with a precise orientation relative to the guide and the pulley.

In particular, the guide is configured to support a further heating element in the proximity of the extrusion nozzle so as to heat the thermoplastic material on which the thermoplastic material extruded by the extrusion nozzle is deposited.

The guide also has this additional function which eases the adhesion of the layers of thermoplastic material.

In particular, the extrusion nozzle is oriented relative to the guide, in particular relative to the drive pulley, so that the projections of the reinforcing fibres on a plane perpendicular to the longitudinal axis are perpendicular to the side of the cross-section of the extrusion nozzle closest to the guide.

In this manner, the reinforcing fibres remain uniformly distributed in the polymeric material extruded by the extrusion nozzle.

The present invention further relates to a print head for additive manufacturing that mitigates the drawbacks of the prior art.

In accordance with the present invention, a print head for additive manufacturing is made, the print head comprising a connecting element; a bearing supported by the connecting element; and said extruder, wherein said mounting member is mounted within said bearing; an actuator and a further drive member for rotating the extruder about the longitudinal axis.

A further objective of the present invention is to manufacture an apparatus for additive manufacturing that mitigates the drawbacks of the prior art.

In accordance with the present invention, an apparatus for additive manufacturing is made, the apparatus comprising a robot having an arm with a movable end along at least three axes; and said print head mounted on the free end of said arm so as to ensure a high number of degrees of freedom of movement to the extruder.

DESCRIPTION OF THE FIGURES

Further characteristics and advantages of the present invention will be evident from the following description of a non-limiting embodiment example thereof, with reference to the Figures of the accompanying drawings, wherein.

PREFERRED EMBODIMENT OF THE INVENTION

Figure 1:
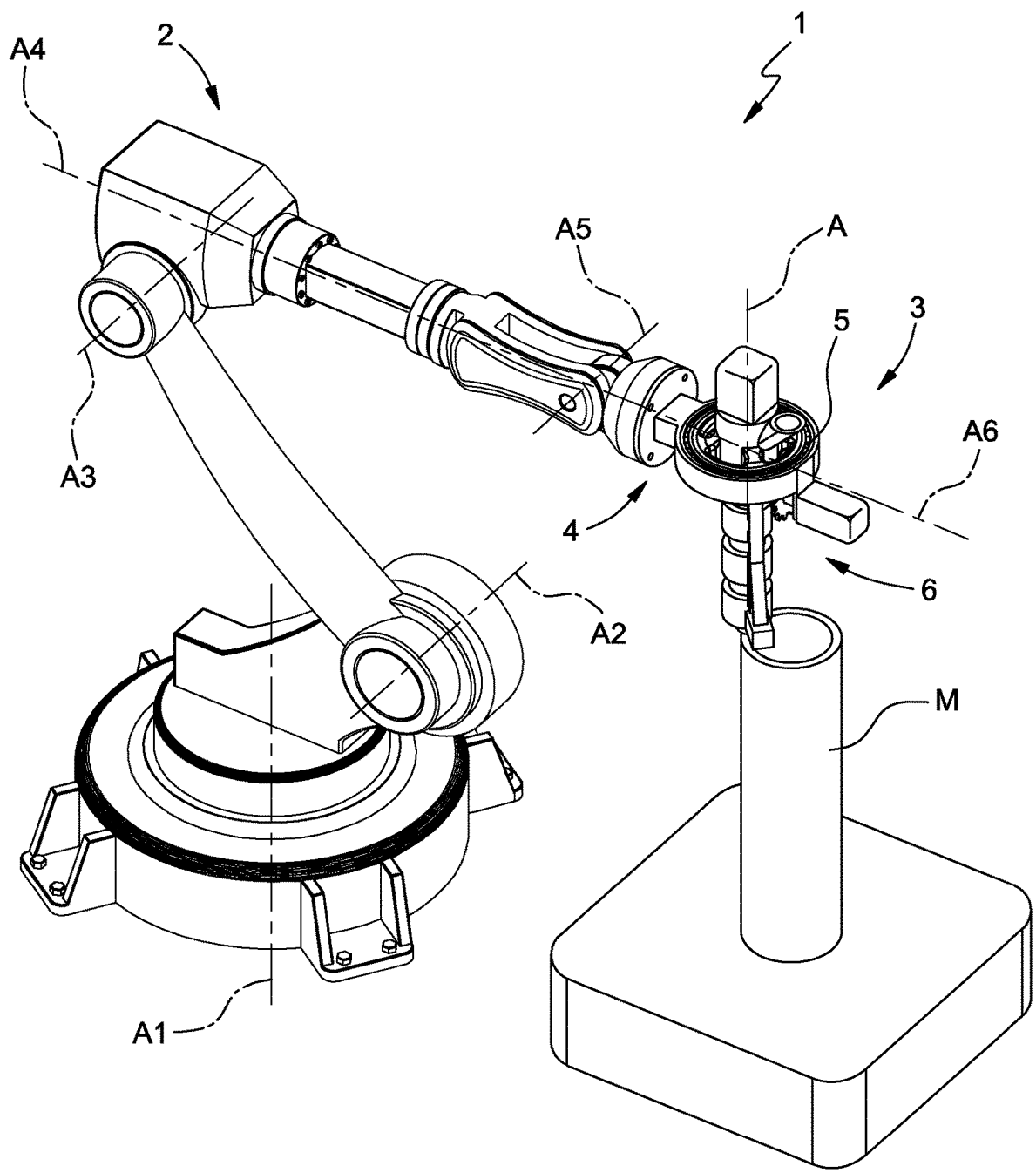
FIG. 1 is a perspective view, with parts removed for clarity, of an apparatus for additive manufacturing in accordance with the present invention.

In FIG. 1, reference numeral 1 indicates an apparatus for additive manufacturing. The apparatus 1 comprises, in this case, a robot 2 with six axes indicated by A1, A2, A3, A4, A5, and A6 and a print head 3 coupled to the distal end of the robot 2 for manufacturing a manufact M with the additive manufacturing technique. The print head 3 comprises a connecting element 4; a bearing 5 supported by the connecting element 4; and an extruder 6, which is mounted within the bearing 5 and extends along a longitudinal axis A coaxially to the bearing 5. In the illustrated case, the connecting element 4 comprises a connecting flange to the robot 2, a connecting ring to the bearing, and an arm which extends between the flange and the ring.

Figure 2:
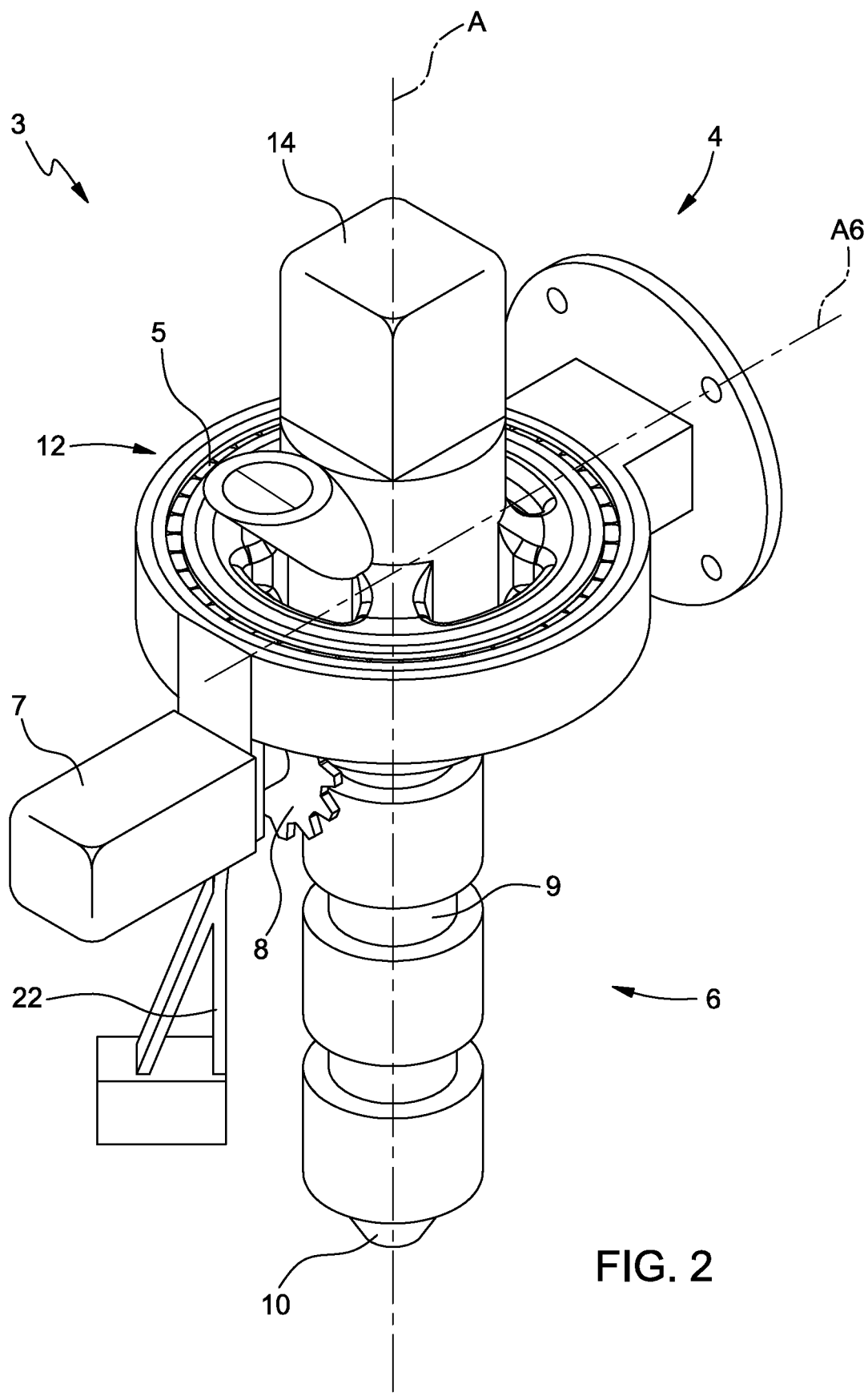
FIG. 2 is a perspective view, with parts removed for clarity, of a print head of the apparatus of FIG. 1.

With reference to FIG. 2, the print head 3 comprises an actuator 7 and a drive member 8 for rotating the extruder 6 about its own longitudinal axis A.

Figure 3:
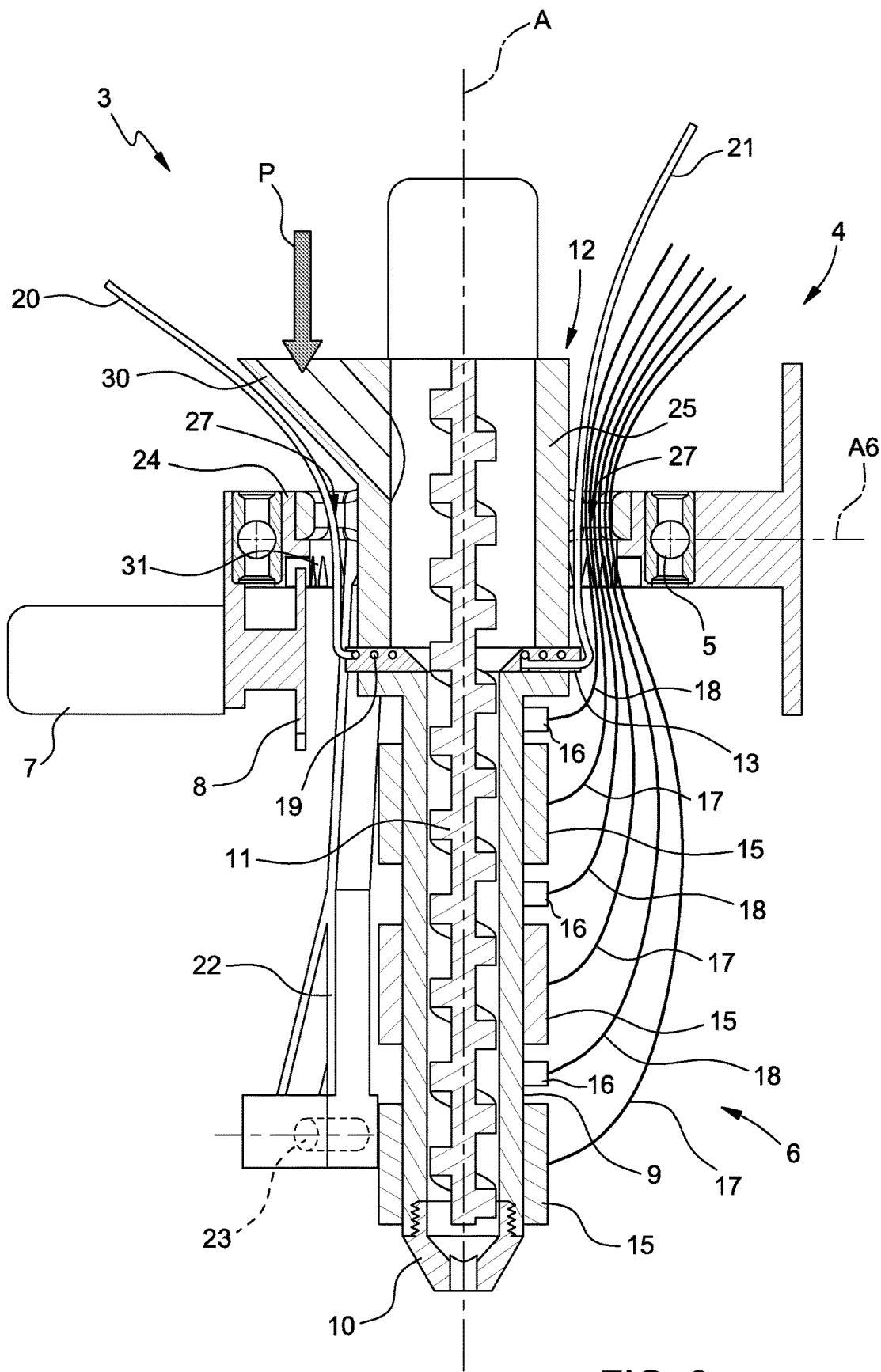
FIG. 3 is a sectional view, with parts removed for clarity, of the print head of FIG. 2.

With reference to FIG. 3, the extruder 6 comprises a cylindrical body 9 extending along the longitudinal axis A and defining a melting chamber; a nozzle 10 arranged at the free end of the cylindrical body 9; an extrusion screw 11 rotatable within the cylindrical body 9 about the longitudinal axis A; a mounting member 12 keyed within the bearing 5; a thermal break ring 13 interposed between the mounting member 12 and the cylindrical body 9; and an actuator 14 supported by the mounting member 12 and configured to rotate the extrusion screw 11 about the longitudinal axis A.

The extruder 6 further comprises three heating elements 15 associated with the cylindrical body 9 and which, in this case, are resistors; temperature probes 16; power cables 17 for supplying power to the heating elements 15; and signal cables 18 for transmitting the signals detected by the temperature probes 16.

The thermal break ring 13 comprises a channel 19 for a cooling liquid, thus the extruder 6 comprises a supply duct 20 for supplying the cooling liquid to the thermal break ring 13; and a return duct 21 for evacuating the cooling liquid from the thermal break ring 13.

The extruder 6 comprises a guide 22 for guiding reinforcing fibres F in the proximity of the nozzle 10 (Figure A).

The guide 22 is attached to the mounting member 12, extends next to the cylindrical body 9 and is substantially parallel to the longitudinal axis A.

At the distal end of the guide 22, a drive pulley 23 is arranged for driving the reinforcing fibres F (FIG. 4) along the hollow arm and supplying the reinforcing fibres in front of the nozzle 10.

The guide 22 is configured to support a further heating element, not illustrated in the accompanying Figures, and configured to heat the thermoplastic material on which the thermoplastic material extruded by the nozzle 10 is deposited.

Figure 4:
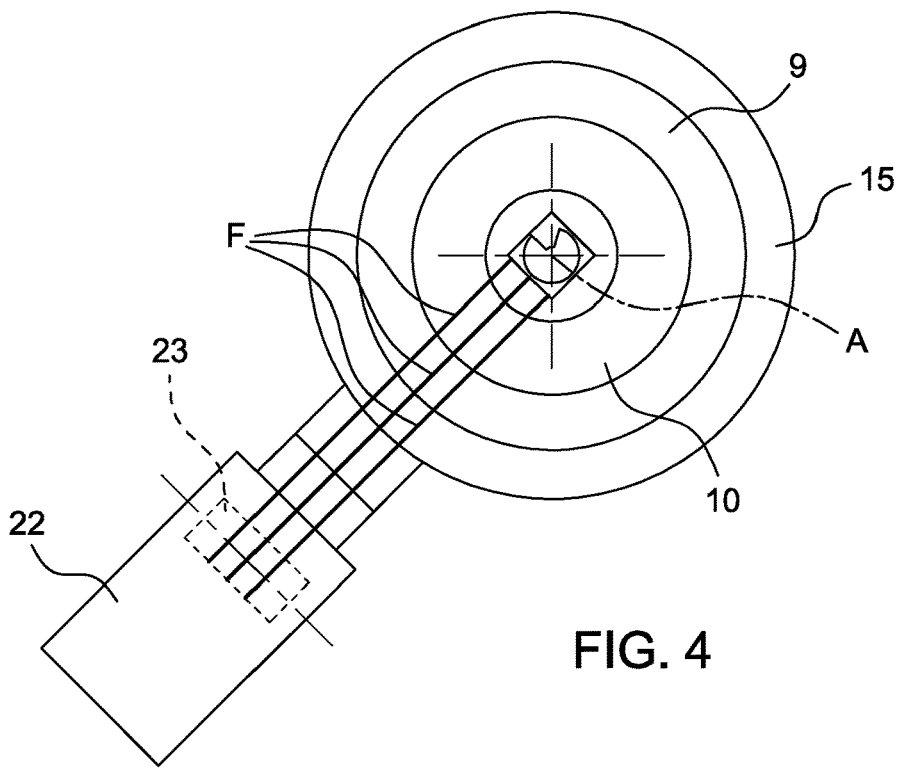
FIG. 4 is a bottom view, with parts removed for clarity, of the print head of FIG. 2.

With reference to FIG. 4, the extrusion nozzle 10 has a polygonal cross-section, in this case, square and is oriented relative to the guide 22, in this case relative to the drive pulley 23, such that the projections of the reinforcing fibres F on a plane perpendicular to the longitudinal axis A are perpendicular to the side of the cross-section of the extrusion nozzle 10 closest to the guide 22.

Figure 5:
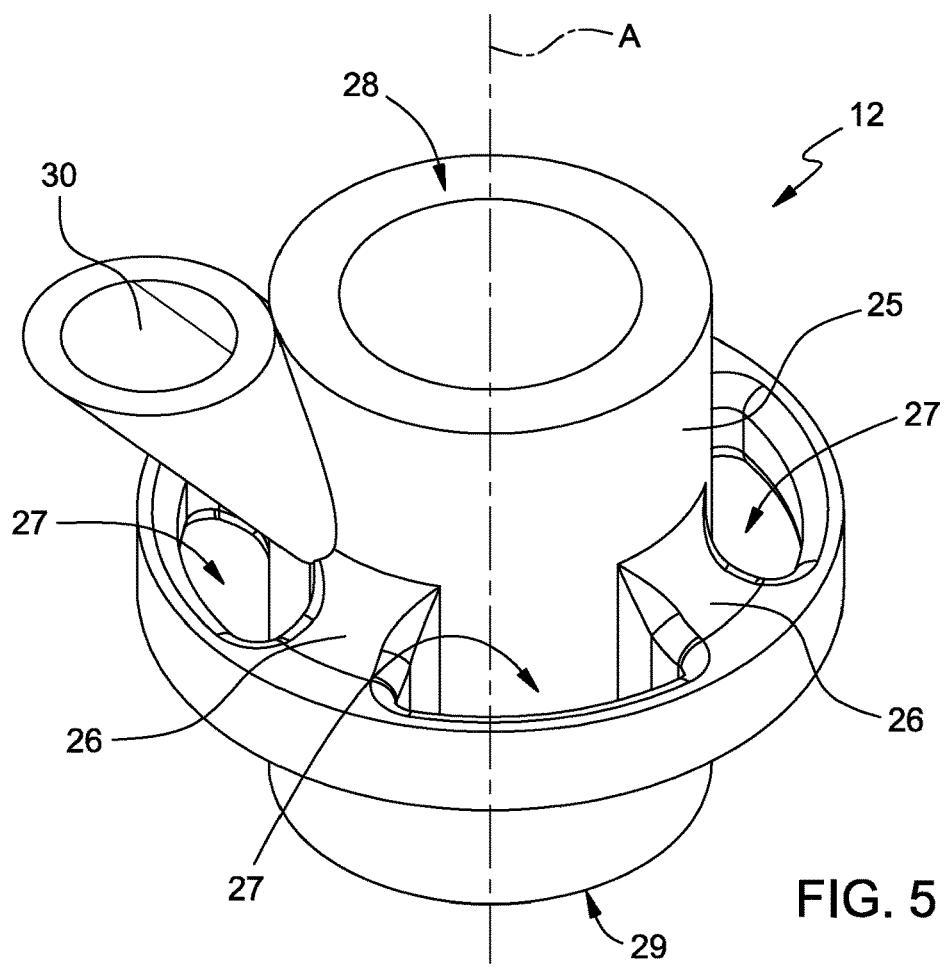
FIG. 5 is a perspective view, with parts removed for clarity, of a component of the print head of FIG. 2.

With reference to FIG. 5, the mounting member 12 comprises a ring 24 configured to be mounted within the bearing 5 about the longitudinal axis A; a hollow body 25 configured to house, in part, the extrusion screw 11 (FIG. 3); and a plurality of spokes 26 for connecting the hollow body 25 to the ring 24 so as to define compartments 27 between the adjacent spokes 26, the hollow body 25 and the ring 24.

With reference to FIG. 3, the hollow body 25 has a substantially cylindrical shape and defines a chamber in communication with the melting chamber, has a first annular face 28 (FIG. 5) configured to be connected to the actuator 14 for rotating the extrusion screw and a second annular face 29 (FIG. 5) configured to be connected to the thermal break ring 13.

With reference to FIG. 5, the mounting member 12 comprises a tubular fitting 30 which extends from the hollow body 25 and is configured to feed pellets P of polymeric material within the chamber enclosed by the hollow body 25.

The mounting member 12 is made by an additive manufacturing process from polymeric material, in particular selected from polyamide with carbon fibres, PPS with carbon fibres, PEEK.

With reference to FIG. 3, the extrusion head comprises a drive member 31, in particular a gear, attached to the ring 24 or integrally manufactured with the mounting member 12. The drive member 31 is coupled to the drive member 8.

In use and with reference to FIG. 1, the print head 3 is arranged with the axis A substantially perpendicular to the surface of the manufact M on which the extruded material is deposited. The apparatus 1 allows arranging and orienting the print head 3 in an infinite number of configurations and, thanks to the orientation of the extruder 6 about the axis A, arranging the extruded material in contact with the surface of the manufact along a flat face of the cord of extruded material.

With reference to FIG. 3, the power cables 17, the signal cables 18, the supply duct 20, and the return duct 21 are inserted in the compartments 27 so as to be constrained although allowing the maneuverability of the print head.

Finally, it is evident that the present invention comprises further variants of the described embodiments included within the scope of protection of the attached claims.

The invention claimed is:

1. A print head for additive manufacturing, the print head comprising:
a connecting element;
a bearing supported by the connecting element; and
an extruder mounted within the bearing and that extends along a longitudinal axis coaxially to the bearing, wherein the extruder comprises:
a cylindrical body extending along the longitudinal axis, having a free end and defining a melting chamber,
an extrusion screw rotatable within the cylindrical body about the longitudinal axis;
an actuator to rotate the extrusion screw;
at least one heating element associated with the cylindrical body;
at least one temperature probe associated with the cylindrical body;
at least one power cable to supply power to the heating element;
at least one signal cable for transmitting a signal acquired by the temperature probe; and
an extrusion nozzle arranged at a free end of the cylindrical body and having a polygonal cross-section for extruding polymeric material;
a polymeric mounting member made by an additive manufacturing process from polymeric material selected from polyamide with carbon fibers, PPS with carbon fibers, and/or PEEK; and
a thermal break ring comprising a channel for a cooling liquid interposed between the mounting member and the cylindrical body, wherein the mounting member comprises:
a ring configured to be mounted to the bearing and allowing the rotation of the mounting member about the longitudinal axis;
a hollow body arranged within the ring and configured to house, in part, the extrusion screw wherein the hollow body has a first annular face configured to be connected to the actuator to rotate the extrusion screw and a second annular face configured to be connected to the thermal break ring;
a plurality of spokes for connecting the hollow body to the ring so as to define compartments between the spokes adjacent the hollow body and the ring so as to arrange the power cable and the signal cable being in at least one of said compartments; and
a tubular fitting extending from the hollow body and configured to feed pellets of polymeric material within the hollow body.

2. The print head as claimed in claim 1 and comprising a drive member and a gear, which is attached to the ring or is integrally manufactured with the mounting member.

3. The print head as claimed in claim 1, wherein the print head comprises: at least one supply duct for supplying the cooling liquid to the thermal break ring; and at least one return duct for evacuating the cooling liquid from the thermal break ring, wherein the supply duct and the return duct are arranged in at least one of said compartments.

4. The print head as claimed in claim 1, and comprising a guide attached to the mounting member and configured to guide reinforcing fibers in the proximity of the extrusion nozzle.

5. The print head as claimed in claim 4, and comprising a drive pulley mounted along the guide to drive the reinforcing fibers along the guide and feed the reinforcing fibers in front of the extrusion nozzle.

6. The print head as claimed in claim 4, wherein the guide is configured to support a further heating element in the proximity of the extrusion nozzle so as to heat the polymeric material on which the polymeric material extruded by the extrusion nozzle is deposited.

7. The print head as claimed in claim 4, wherein the extrusion nozzle is oriented relative to the guide such that projections of the reinforcing fibers on a plane perpendicular to the longitudinal axis are perpendicular to the side of the cross-section of the extrusion nozzle closest to the guide.

8. The print head as claimed in claim 1 and comprising an actuator and a further drive member for rotating the print head about the longitudinal axis.

9. An apparatus for additive manufacturing, the apparatus comprising a robot having an arm with a movable free end along at least three axes; and a print head as claimed in claim 8 and mounted on the free end of said arm.

* * * * *